Oct. 27, 1931.  A. M. ROSSMAN  1,828,946
TRACK AND CHANGE-OVER MECHANISM FOR ELECTRIC RAILWAY SYSTEMS
Filed April 23, 1929   5 Sheets-Sheet 1
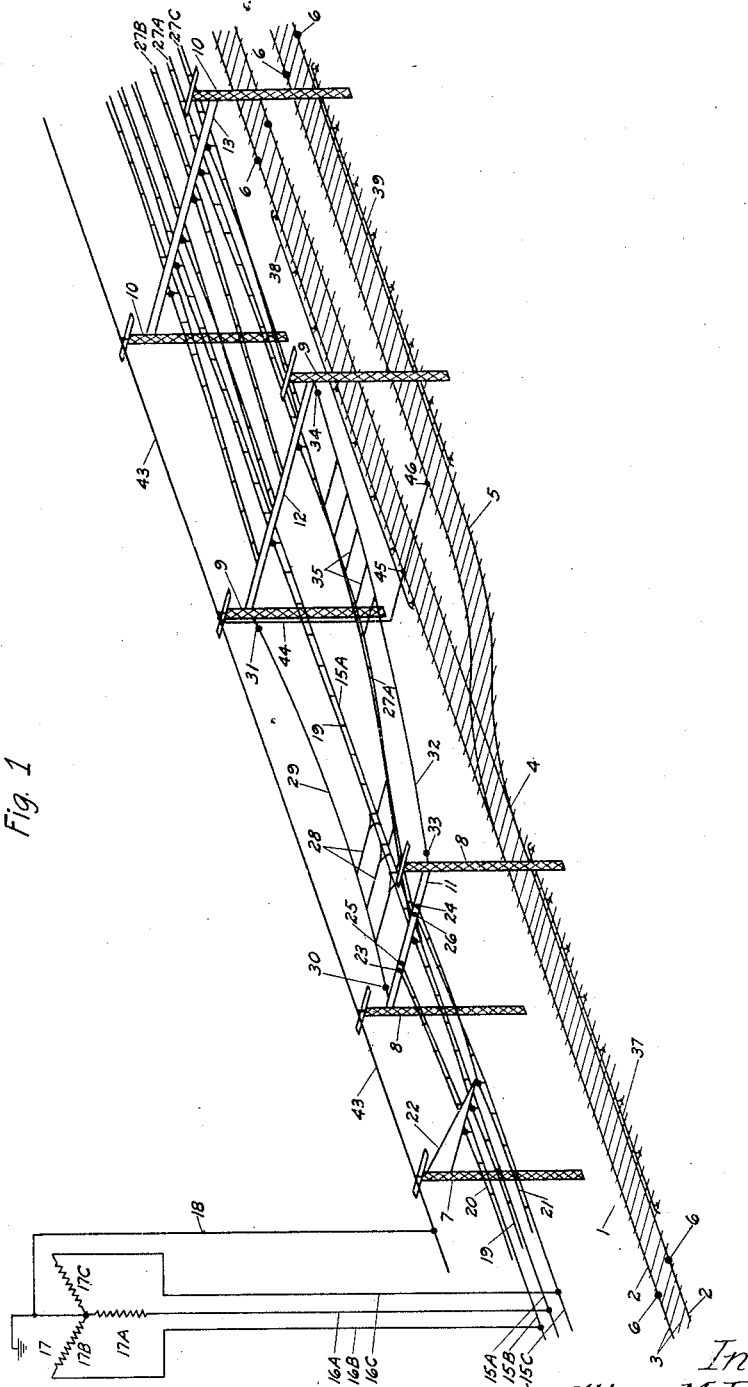

Oct. 27, 1931.   A. M. ROSSMAN   1,828,946
TRACK AND CHANGE-OVER MECHANISM FOR ELECTRIC RAILWAY SYSTEMS
Filed April 23, 1929   5 Sheets-Sheet 2
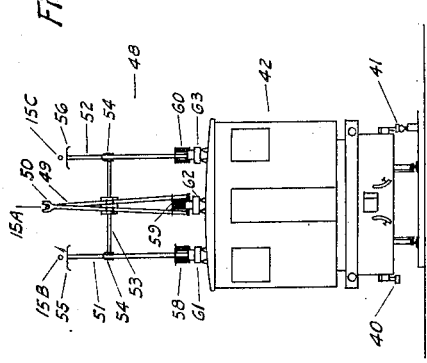
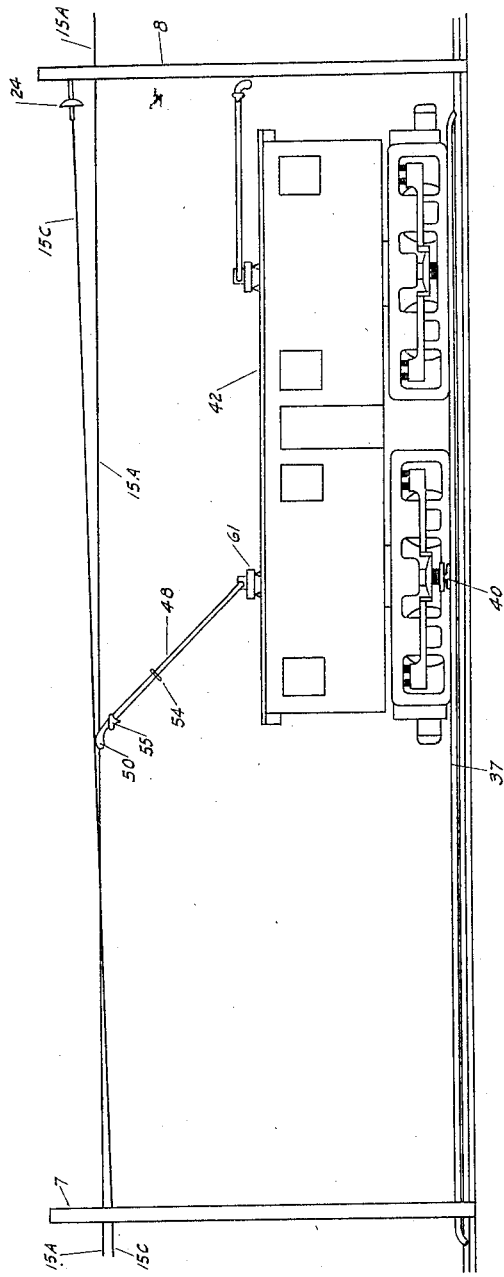
Inventor
Allen M. Rossman
By Brown, Jackson, Boettcher + Dienner
Attys.

Oct. 27, 1931.        A. M. ROSSMAN        1,828,946
TRACK AND CHANGE-OVER MECHANISM FOR ELECTRIC RAILWAY SYSTEMS
Filed April 23, 1929    5 Sheets-Sheet 3

Inventor
Allen M. Rossman
By Brown, Jackson, Boettcher & Wiener.
Attys.

Oct. 27, 1931.   A. M. ROSSMAN   1,828,946
TRACK AND CHANGE-OVER MECHANISM FOR ELECTRIC RAILWAY SYSTEMS
Filed April 23, 1929   5 Sheets-Sheet 4
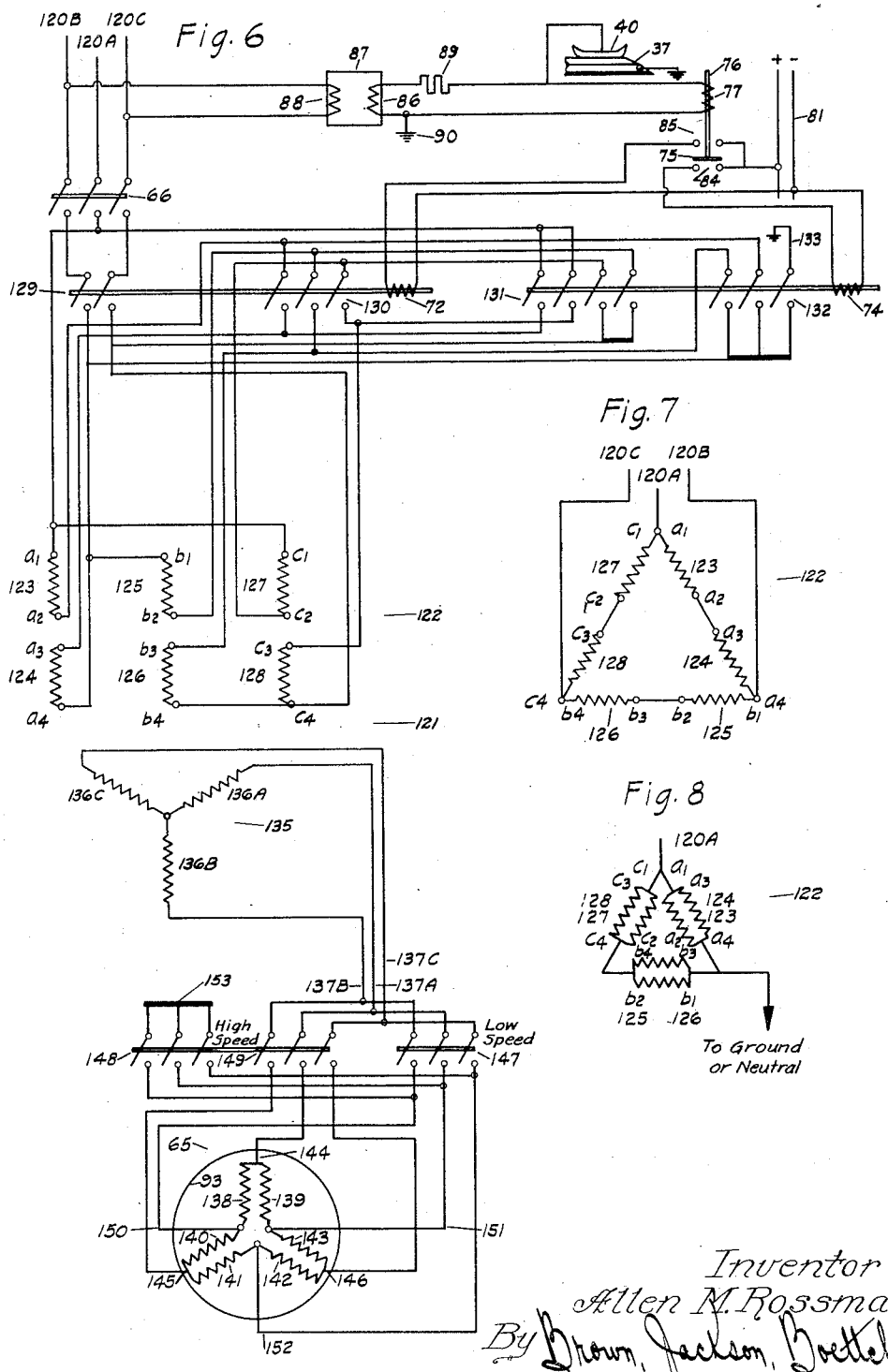
Inventor
Allen M. Rossman
By Brown, Jackson, Boettcher
& Dienner
Attys.

Oct. 27, 1931.  A. M. ROSSMAN  1,828,946
TRACK AND CHANGE-OVER MECHANISM FOR ELECTRIC RAILWAY SYSTEMS
Filed April 23, 1929    5 Sheets-Sheet 5
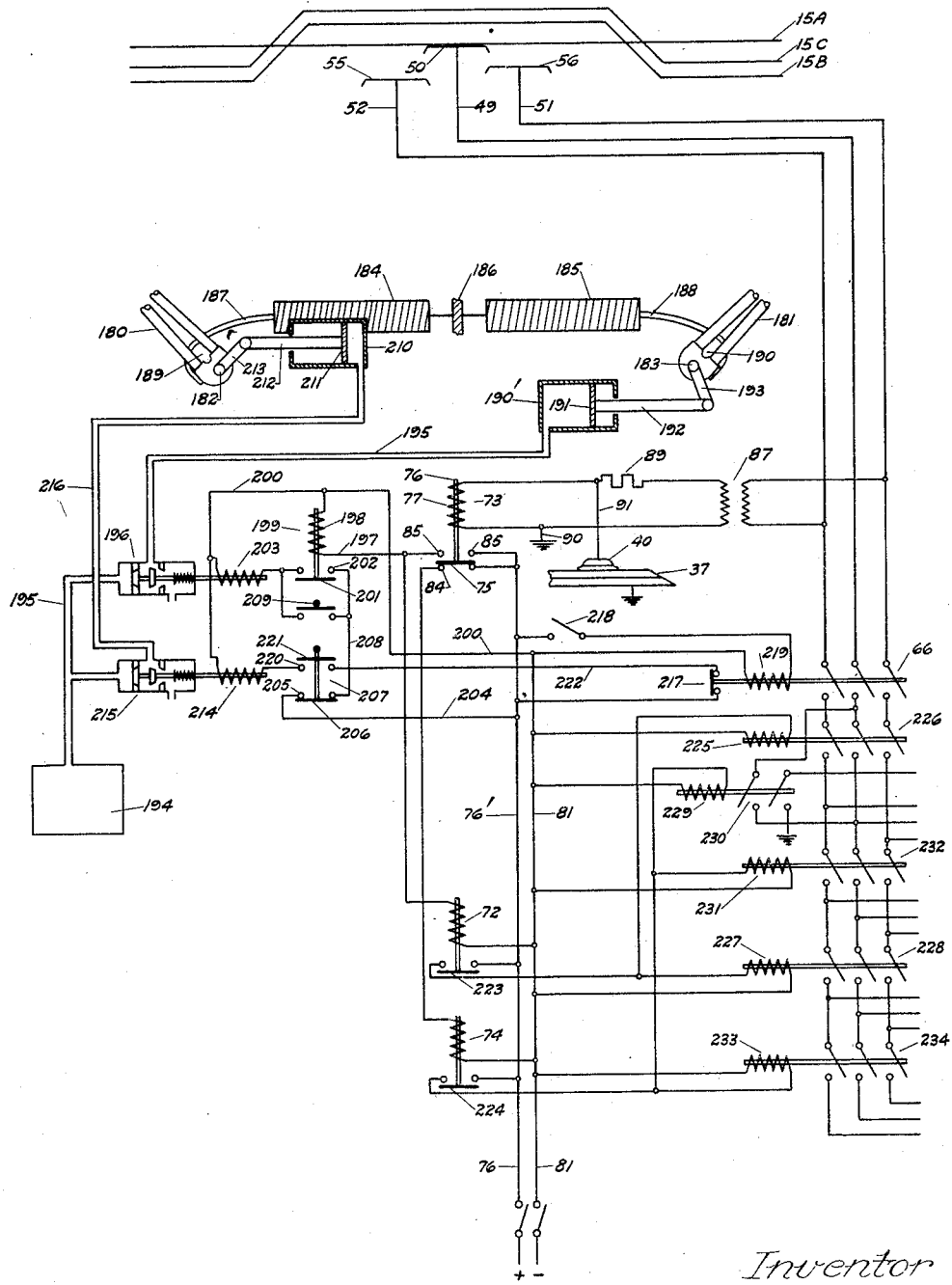

Patented Oct. 27, 1931

1,828,946

UNITED STATES PATENT OFFICE

ALLEN M. ROSSMAN, OF CHICAGO, ILLINOIS, ASSIGNOR, BY MESNE ASSIGNMENTS, TO ROSSMAN PATENTS, INCORPORATED, OF CHICAGO, ILLINOIS, A CORPORATION OF ILLINOIS

TRACK AND CHANGE-OVER MECHANISM FOR ELECTRIC RAILWAY SYSTEMS

Application filed April 23, 1929. Serial No. 357,539.

My invention relates to electric railways and the like. More particularly my invention provides means for automatically changing the connections of the electric locomotive or motor car from one set of current collecting devices to another as, for example, from a plural wire trolley to single wire trolley and vice versa. Also, the invention provides means for automatically changing the operating connections of the locomotive or motor car from a connection suitable to one form of current supply to a connection suitable for another as, for example, to change from three phase current to single phase current operation or vice versa. In the preferred form of my invention both of these changes are made simultaneously but it is to be understood that the invention comprehends a system which embodies either feature alone. As an incident to such changes or independently of them, other features may be controlled, as for example, raising or lowering of the pantograph or contact shoes or the like.

In the electric railway system of my invention disclosed more in detail in my copending application, Serial No. 357,538 filed April 23, 1929, I show an electric railway which is characterized by the employment of alternating current motors supplied with three phase current on main line track and single phase current on crossovers, sidings and terminals. While I prefer to employ sixty cycle alternating current in view of its universal availability, any commercial frequency may be used.

According to the present invention means is provided for making the changeover from three phase to single phase automatically. In the preferred embodiment, after the changeover from three phase to single phase connections is made, the changeback of connections from single phase to three phase is not made until three phase current is actually available, i. e., received by the collectors from the trolley, a contact rail is placed alongside the track and a contacting shoe carried by the motor car engages the same in advance of the track intersection to cause switchover from three phase to single phase. The breaking of the connections devolves upon a circuit breaker designed to do the work so that arcing at the trolleys is avoided. The relay which controls the changeover tests the trolleys for receipt of three phase current and as soon as the same is available disengagement of the controlling shoe from the third rail permits the relay to change over to three phase connections.

While I speak of changeover from three phase to single phase, I contemplate within the invention a changeover from one form of drive to another, as, for example, from alternating current to direct current or vice versa. Also, my invention comprehends change of connections for trolley change only as, for example, from a two wire single phase trolley to a single wire single phase trolley with the return circuit at crossovers and the like carried through the track rails or third rail.

Now, in order to acquaint those skilled in the art with the manner of constructing and operating a system embodying my invention, I shall describe in connection with the accompanying drawings a specific embodiment.

Fig. 1 is a diagrammatic isometric view of the trolley and track of a system embodying the present invention;

Fig. 2 is a side view of the trolley and track with a suitable locomotive operating in connection therewith;

Fig. 3 is an end view of the same;

Fig. 6 is a diagram of connections of the transformer for three phase or single phase operation and of the motor for low speed or high speed operation;

Fig. 7 is a simplified diagram of the transformer connections for three phase;

Fig. 8 is a similar diagram of the transformer connections for single phase;

Fig. 9 is a diagram showing the automatic control of the pantograph.

Figure 4:
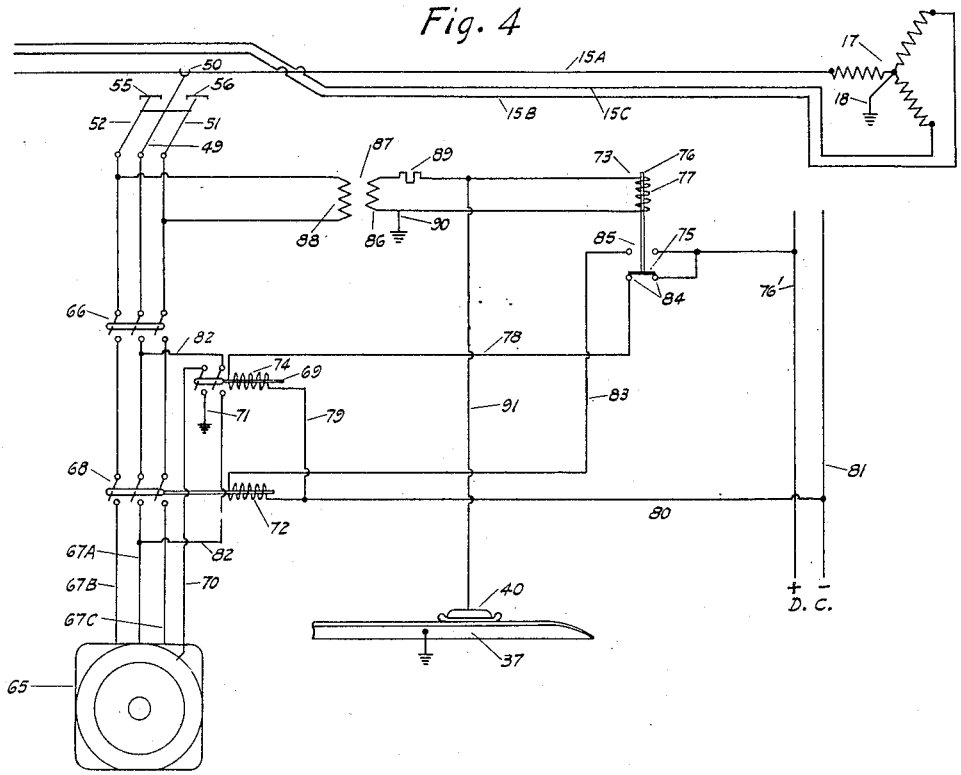
Fig. 4 is a diagram of connections.

According to Figures 1, 2 and 3, track 1 is shown as comprising a pair of rails 2—2 mounted on the usual ties 3—3 in the usual manner. The main line of track 1 is connected through a switch 4 with siding track 5. At the points indicated as 6—6 in both the main line 1 and the siding 5 insulated joints are provided and between these insulated joints the rails are laid on well creosoted ties to separate the track circuit, which is presently to be described, from the ground. These ties in the section involving the track return circuit are laid preferably in crushed rock ballast to further the insulating properties of the ties so that no direct ground connection is made from the rails. Obviously, a third rail could be employed instead of the track rails at the track intersection if desired. The overhead trolley system shown is suitably supported by single towers such as 7 at the left of Figure 1 or by pairs of towers such as 8—8, 9—9, 10—10 connected by bridges or cross beams 11, 12 and 13 respectively. The trolley conductors on main line track as indicated at the right by reference numerals 15A, 15B and 15C are connected through suitable connections as indicated at 16A, 16B and 16C to a source 17 of three phase current having a neutral connection as indicated by the conductor 18. The neutral point of the transformer is preferably grounded to hold the potential at a definite value.

The trolley conductors 15 are suspended by suitable messenger wires to form what is termed a catenary suspension of well known type. The messenger wires 19, 20 and 21 are suitably suspended or supported through insulators from or upon the bracket arm 22 at the post 7. The central messenger wire 19, which carries in this case the A phase, is carried past the bridge or beam 11 and continued throughout the length of the part of the system shown in Fig. 1. The trolley conductor 15A carried by said messenger wire or cable 19 is also continued over the switch 4. It is the only trolley phase that is continued across the switch 4. A branch trolley wire of the same phase extends over the siding 5 between towers 8 and 9. The messenger wires 20 and 21 are dead ended upon the bridge 11 by suitable insulators as indicated at 23 and 24, and also the trolley conductors 15B and 15C likewise are dead ended on insulators 25 and 26 on said bridge member 11. From the post 7 to the bridge 11 the trolley conductors 15B and 15C are carried upwardly to a point well above the level of the central trolley conductor 15A as will be apparent in Figure 2.

In the continuous run of trolley corresponding to the main line track, free of intersections, the normal position of the trolley wires 15A, 15B and 15C is that the central trolley wire 15A is carried at a level higher than the level of the two outer trolley wires 15B and 15C. For example, in a system of this character employing approximately 13,500 volts on the trolley, the central trolley wire is carried at a level six inches higher than the outer trolley wires, and where the approach to a crossover or switch is made, the outer trolley wires are trained upwardly until they lie well above the central trolley wire which is employed for single phase as will be described more in detail later. While this is an advantage in clearing the trolley shoes of the other phases, it may be dispensed with without departing from other features of the invention.

The central trolley wire 15A continues from the three phase section through the single phase section and again becomes part of the three phase trolley system at the right of the switch 4 as shown in Figure 1. The phases which are discontinued as trolley wires are carried as phase conductors through the track intersection and beyond the same again resume the character of trolley wires. This is done either by overpassing conductors or as cables extending underground. In the span between the towers 8 and 9, the branch trolley conductor 27 is extended from the central trolley conductor 15A, this branch 27A being suitably suspended from messenger wire or catenary cable as is the case throughout the rest of the system. The straight trolley conductor 15A is anchored as by means of tie wires 28 to a cable 29 suspended as by strain insulators 30 and 31 from the towers 8 and 9. Likewise, a suspension cable 32 connected through strain insulators 33 and 34 serves through the medium of tie wires 35 to hold the trolley wire 27A over the siding track 5. Such a guide is provided as will hold the branch trolley 27A substantially in register over the switch 4 and siding 5 and as will readily permit the trolley collector shown in Figures 2 and 3 to follow the trolley conductor.

Beyond the tower 9, that is, to the right of tower 9 as shown in Figure 1, the two outer trolley wires are again provided and they are connected electrically to the trolley wires 15A, 15B and 15C at the left of the switch 4.

Whereas, the messenger wire 19 and the trolley wire 15A are continued on the same level throughout over the straight run of track, the outer trolley conductors are interrupted at the switch, crossover or the like, and in the case of a terminal or yard the outer trolley conductors may be discontinued and a single phase trolley conductor may be employed in such yards, terminals, sidings and the like if desired. However, as shown in Figure 1, it is assumed that the siding 5 is an incident to the main line track 1 and that it is desired to provide three phase power for motor cars on either the main line track or on the siding. Therefore, the outer trolley conductors are again provided at the right of the switch, the trolley conductors and their suspension catenary wires being dead ended upon the bridge 12 at a level sufficiently above the single phase trolley wires 15A and 27A to clear the collectors. They are connected in parallel with the trolley wires on the main track 1.

At the approach to the switch 4 from the left, I provide a contact rail 37 which may be designated broadly as a track contact or as a positional contact in the sense that it is a controlling contact positioned in such relation to the main line track that as the motor car approaches the switch a changeover may be made from three phase to single phase, the motor car being so organized as to permit of such operation. Likewise, at the approach to the switch 4 from the right on both the main line track 1 and on the siding 5, track contacts indicated at 38 and 39 are provided.

These track contacts are preferably connected to the track rail or they may be grounded and are adapted to engage with shoes 40 or 41 carried on the sides of the motor car or locomotive 42. I employ the term "motor car" herein to designate a vehicle employing a driving motor. It may be in the form of a locomotive or of a passenger car with a driving motor or a goods conveying car with a driving motor.

While I speak herein of single phase trolley, I mean by the term single phase to include broadly current from either a single phase source of current or that flowing between two phase wires of a source of three phase alternating current or from phase to neutral which is the preferred form of connection in the present system. The neutral connection from the three phase source 17 is carried by an overhead conductor 43 on the towers as indicated at Fig. 1 in suitable insulated relation to the grounded structure of the towers. This neutral conductor 43 forms a part of the transmission system for single phase operation. It is not essential for three phase operation and hence, where a local source of power is available adjacent a single phase section of the system, the neutral conductor 43 is preferably provided only along the single phase section. The return for the neutral conductor is provided through the track rails. A connection 44 is shown as extending from the overhead neutral conductor 43 down to the track rails where a connection 45 is made to the main line track and a similar connection 46 is made to the siding 5. Throughout the single phase section and between the insulated joints defining the same, the track is bonded to provide a return of minimum resistance. Since the single phase section is relatively short, this affords no great difficulty.

Likewise, due to the fact that the single phase section is relatively small, only a minimum disturbance electro-magnetically will be created on adjacent signalling and communication circuits.

Obviously, if desired, the neutral conductor could be carried by third rail instead of the track rails. Likewise, it could be carried overhead or at the side of the track if desired. In fact, the trolley itself could be disposed on the ground at the sides of the track or on the pole line at the side of the track. By bonding and the use of insulating joints, well creosoted ties and rock ballast, the leakage currents are suitably minimized. The motor car 42 is provided with a current collector indicated at 48, Figures 2 and 3. The construction of this collector is described more in detail in my copending application, Serial No. 366,231, filed May 27, 1929, and will be described here only generally. The collector 48 comprises a central controlling trolley pole 49 provided with a shoe 50 guiding at all times on the central trolley conductor 15A. The trolley pole 49 has at each side thereof shorter trolley poles 51 and 52 connected to the main trolley pole 49 by a cross bar 53 which is connected to the trolley pole 49 and connected through the lost motion connection as indicated at 54—54 to each of the trolley poles 51 and 52 to allow the shorter trolley poles 51 and 52 to float independently through a limited range only. The cross bar 53 and the connections 54 are such as to compel the poles 51 and 52 with their pan shoes 55 and 56 to be maintained in alignment with the trolley conductors 15C and 15B respectively.

Now, as will become apparent from Figures 2 and 3, as the motor car 42 approaches the switch or crossover, the outer trolley conductors 15C and 15B, being trained from a position below the level of the central trolley conductor 15A to a position well above the same, the pan collector shoes 55 and 56 are compelled to leave the outer trolley wire conductors since they cannot rise, being restrained by the central trolley pole 49 and the cross bar 53. Because of connection 53—54 of the shorter poles 51—52 to the central pole 49, these shorter poles are prevented from rising as high as the central trolley wire 15A, hence they will always clear a branch trolley such as 27A or a cross trolley wire on the same level which may be termed the single phase level. Suitable spring means indicated at 58, 59 and 60 operate upon the trolley poles to cause them to swing upwardly on aligned horizontal axes to engage the trolley wires with which they cooperate. The poles 49, 51 and 52 are pivotally mounted at 61, 62 and 63 on vertical pivots to permit said poles to pivot laterally for following the trolley conductors when the motor car goes around a curve or takes a switch or the like. Any suitable form of collector may be employed instead of the one here shown. See, for example, the pantograph collector shown in my copending application Serial No. 357,538.

Referring now to Figure 4, the alternating current driving motor, of which there may be as many as there are driving axles on the motor car, is indicated at 65. This motor is preferably a squirrel cage motor having windings arranged for two speeds; for example, for a speed of say 600 R. P. M. and upon changing the connections to the taps leading to the windings for a speed of 1200 R. P. M. Between the collector poles 49, 51 and 52 and the windings of the motor 65, I provide a main control switch 66, which is preferably an oil circuit breaker since the trolley conductors operate at, for example, 13,500 volts between phases. The motor is operated at any suitable voltage by the interposition of a transformer. (See Figs. 6 to 9.)

This circuit breaker 66 (see Fig. 4) may be suitably controlled for purposes of opening the circuit to the mechanism in the motor car and particularly for cutting off the motor 65. This switch is preferably cut in ahead of the transformer as in Fig. 6 so that the entire car is cut out. The terminals of the motor indicated at 67A, 67B and 67C are adapted to be connected to the terminals of the switch 66 through an automatic changeover switch 68 when the motor is to be operated on three phase current. A cooperating automatic switch 69 is adapted to close when the motor is to be supplied with single phase alternating current. In the present instance the motor 65 is provided with a central or neutral tap 70 which is adapted to be connected to a suitable return in this case indicated by ground at 71 when the motor is to be operated single phase, which in this instance means phase A to neutral. The switch 68 is adapted to be operated by a solenoid 72 under the control of the changeover relay 73. Likewise, the switch 69 is adapted to be operated by the solenoid 74 under the control of the changeover relay 73. The changeover relay 73 has a contactor 75 and a solenoid plunger 76 under the control of the winding 77. When the plunger 76 drops, the contactor 75 closes the circuit for the solenoid 74 from the direct current bus 76' through the lower pair of contacts through the wire 78, winding of solenoid 74, wire 79, return 80 to the direct current bus 81. Such energization of the solenoid winding 74 closes the switch 69 connecting the winding of the motor 65 between phase A and the neutral return 71.

This is accomplished by a pair of switch members, one of which connects the neutral connection 70 to the return 71 and the other of which closes a shunt circuit 82 about the switch 68 for the A phase conductor 67A.

When the solenoid winding 77 of the relay 73 is energized, the contactor 75 is raised to close the upper pair of relay contacts, thereby closing a circuit through the wire 83, solenoid winding 72, return 80, to the D. C. bus 81. As the contactor 75 leaves the lower pair of contacts, it breaks the circuit for the solenoid 74, opening the single phase connection, and as it engages the upper pair of relay contacts 85 it causes closing of the switch 68 for three phase operation of the motor 65. Obviously, instead of two separately operated switches the two switches might be connected and operated as a single switch. Also, instead of direct operation by solenoids operating mechanisms with electric trips might be used. Also, instead of controlling the motor circuit directly the relay 73 may control the primary side of the transformer, the secondary of which leads to the motor or motors. (See Figs. 6 and 7.)

The relay 73 has its winding connected in series with the secondary 86 of the potential transformer 87, the primary winding 88 of which is bridged across the two outer phase conductors for the B and C phases. As the motor car approaches a switch or crossover or the like where the trolley conductors 15B and 15C are trained upwardly above the central trolley conductor 15A, the circuit for the transformer winding 88 would be opened and the relay winding 77 deenergized by the trolley shoes 55 and 56 leaving the outer trolley wires. However, it is not desirable to break the circuit at the trolley shoes, as this might result in undesirable arcing. It is therefore arranged that the circuit will be broken at the switch 68 and for this purpose track contact or rail 37 is so placed with respect to the region where the outer trolley conductors are trained upwardly that the circuit will be opened for three phase operation and closed for single phase operation before the collector shoes leave the corresponding outer trolley wires. The manner in which this is accomplished is apparent from Fig. 4. The circuit of the secondary winding 86 of the transformer 87 includes in series with the solenoid winding 77 of the relay 73 a protective resistance 89. One terminal of the winding 86 is grounded to the wheels of the motor car through the frame as indicated at 90 and the other side of the closed series circuit is connected beyond the resistance 89 to the control wire 91 leading to the shoes 40 and 41 for cooperation with the track contact such as 37, 38 and 39, which track contacts in turn are grounded to the track rail 2.

The engagement of the shoe 40 with the grounded contacts 37, 38 or 39 deenergizes the winding 77 of the relay 73 sufficiently to cause it to drop its contactor 75. Obviously, a different form of transfer relay mechanism may be employed within my invention, the desired function being to cause an automatic transfer from one connection to another as for example from three phase to single phase when the shoes 40 or 41 engage the track contacts. The track contacts 37, 38 and 39 are of sufficient length that they bridge the point where the collector shoes on the trolley poles leave or engage the outer trolley wire conductors. After the separation of the collector shoes from the outer trolley wires, the relay 73 is unable to pick up since its energizing transformer 87 is without current. Hence, after the motor car once enters the zone of single phase operation, it continues in single phase operation until such time as the current again appears upon the outer collector shoes from the trolley and the controlling shoes 40 or 41 are off of the track contacts, such as 37, 38 or 39.

While the specific function of the shoes 40 and 41 engaging the track contacts is to shunt the winding of the control relay 77, this is only one specific way in which the operation may be secured. A relay with two windings might be employed, one of the windings being under normal control to keep three phase operation in service, this winding to be overpowered by another winding to shift to single phase operation under the control of engagement of the shoes 40 or 41 with the track contacts.

Figure 5:
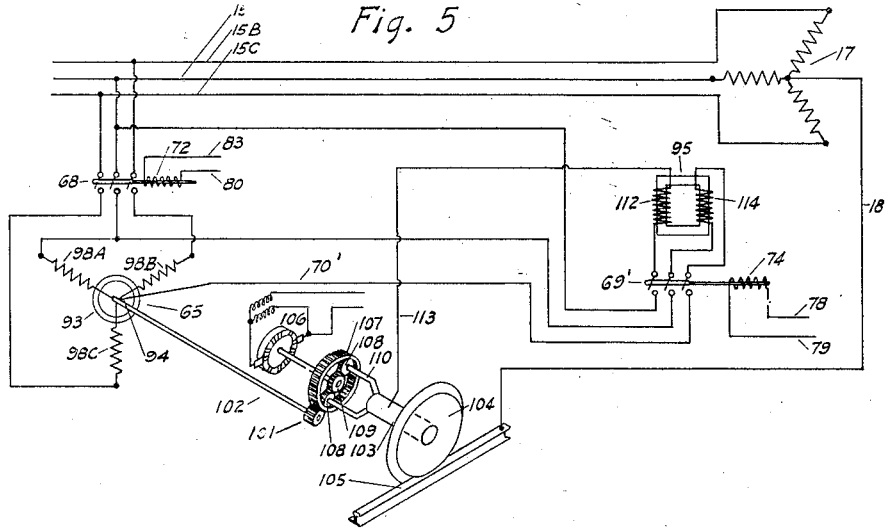
Fig. 5 is a generalized diagram of the motor and its windings in relation to the source of current.

In Figure 5 I have indicated diagrammatically some further details of the motor system which may be employed. The induction motor 65 has a squirrel cage armature 93 and two sets of windings (not shown) for operation at different speeds. The neutral point of these windings is indicated at 94 and the wire 70' is led out therefrom. Where the motor 65 is to be operated on single phase current it is preferably subjected to an increase of voltage. This may be accomplished by employing a transformer indicated at 95, although transformer 95 may be a part of the main transformer as will be explained more in detail in connection with Fig. 6.

Preferably the trolley is operated at a voltage of the order of 13,500 volts, and a transformer is employed so that the local circuit for the motor is operated at a lower voltage. This, however, is a matter of option. In the diagram of Figure 5, I have indicated the conductors 15A, 15B and 15C leading from the three phase source 17 as having connection directly to the windings of the motor 65 through the switch 68. When it is desired to operate motor 65 on phase A to neutral, the voltage on the winding 98A which is employed for the single phase operation is preferably increased. The connections for doing this are shown in Figs. 6 to 8 but the same is indicated generally in Fig. 5. This is done in Fig. 5 by opening the switch 68 and closing the switch 69' which cuts the transformer 95 into the phase A to neutral circuit to increase the voltage upon the single phase winding 98A. The selection of upper or lower speed is arranged by the controller switch (not shown) to put the sections of the motor windings in series or in multiple, as for example in star or in delta connection.

In the mechanical drive of the motor car the armature of the motor 65 is connected through a differential gear 102 to the driving axle 103 which bears the track wheel 104 running on the railroad track 105.

A direct current motor 106 is coordinated mechanically with the main alternating current motor 65 through the differential gear 102 as indicated in Figure 5. The controller previously mentioned coordinates these motors electrically. The shaft of the motor 65 is connected to a pinion 101 and it meshes externally with a ring gear 107, having internal teeth meshing with the idlers 108. A central pinion 109 lies between and meshes with the idlers 108. The idlers 108 are connected through a suitable cage 110 to the axle 103. The construction of this gear drive is described more in detail in my copending application, Serial No. 357,540, filed April 23, 1929. The alternating current motor 93 is not called upon to start the motor car, this duty developing upon the direct current motor 106, the armature of the alternating current motor being held stationary at this time to keep the ring gear from moving, the direct current motor driving the cage 110 and applying the necessary starting torque to the driving wheels.

After the car is under way, the shaft of the motor 65 is released and the direct current motor is reversed to bring the alternating current motor 65 up to a speed where alternating current may be applied to it to cause it to pick up the load and to drive both the driving wheel 104 and to drive the direct current motor 106, all as explained in said copending application.

In the system shown in Figure 5, the primary winding 112 of the transformer 95 is connected from the A phase to the neutral return through the wire 113, through the motor car frame and wheel 104 to the track 105, which is connected to the neutral point of the three phase source 17. The secondary winding 114 then includes in its local circuit the windings 98A of the motor through the neutral return wire 70.

In Fig. 6, I have shown a diagram of connections for the changeover system including the transformer connections and the motor connections. The motor connections include means for changing from low speed to high speed and vice versa of the motor.

The transformer 121 has a primary 122 consisting of six coils or windings 123 and 124 for the A phase, 125 and 126 for the B phase and 127 and 128 for the C phase connected in series by means of the switch mechanism 129 and 130 which are preferably operated in unison by suitable mechanism such, for example, as the solenoid 72 and common connecting bar for the switch members.

In practice the switches may be operated by air cylinder springs or by motors or other mechanism under the control of a coil such as the solenoid coil 72. The connections for the transformer primary windings are also controlled by a pair of switch mechanisms 131 and 132 operated preferably in conjunction as by the solenoid winding 74 and the connecting member, these switching units likewise being in practice preferably operated by air cylinders, springs or other suitable operating mechanism under the control of the coil 74. The main switch 66 in the three phase line 120A, 120B and 120C cuts off the transformer from the trolley as previously explained to break the current flow or to establish current flow as may be desired.

The connections which are established by the two sets of mechanism are illustrated in Figs. 7 and 8. When the switches 129 and 130 are closed and switches 131 and 132 are open the windings are all connected in series with taps leading out to the main supply wires 120 as indicated in Fig. 7.

When the switches 129 and 130 are open and the switches 131 and 132 are closed the primary coils are connected in parallel in pairs and these pairs of windings are connected in delta with the full voltage between phase A and neutral or ground, which voltage is impressed upon the coils 123 and 124 in parallel and upon the coils 128 and 127 in parallel and coils 125 and 126 in parallel but the latter two pairs being connected in series.

Hence, for single phase operation the major part of the current flows through the coils 123 and 124. The coils 127 and 128 have half of the full voltage impressed upon them and the coils 125 and 126 likewise have half of the full voltage impressed upon them on single phase operation.

The secondary 135 comprises three windings connected in star and these windings 136A, 136B and 136C remain in fixed relation to each other. It can be seen that by the shifting of connections as indicated in Fig. 7 for three phase operation to Fig. 8 for single phase operation the ratio of transformation between the primary and secondary is changed. Consider, for example, that in the case of the A phase in Fig. 7 the full voltage between phase is impressed upon the two coils 123 and 124 in series, whereas in single phase operation phase to neutral voltage is impressed upon the same coils in parallel connection. The resistance of this leg is therefore only one quarter of what it would be as shown in Fig. 7. Likewise the current flow through the B and C phase legs is about twice the current flow of the B and C phase legs in the diagram of Fig. 7. The result is therefore that on single phase the transformation ratio has been changed to increase the voltage impressed upon the motor 65.

The motor has six coils or windings 138 to 143 inclusive, these windings are, when control switches 148 and 149 are open and control switch 147 is closed, connected in series with taps taken out at 150, 151 and 152 for delta connection and when the switch 147 is open and switches 148 and 149 are closed the windings are connected as double star windings, the taps 150, 151 and 152 being connected together by the short circuit connection 153.

The normal low speed connection is made by closing the switch 147, leaving switches 148 and 149 open. For high speed which is substantially double that of low speed the switch 147 is opened and switches 148 and 149 are closed. The control of these switches 147 and 148—149 is under a suitable controller operated by the driver of the vehicle.

The automatic changeover affected by the shoe 40 and track contact 37 through the changeover relay 76 is carried on independently of the connections of the motor windings to the secondary 135 of the transformer 121. That is to say, the changeover from three phase to single phase and vice versa is a matter which is independent of the high and low speed connections of the motor. The motor 65 is a squirrel cage induction motor having a single stator winding with taps taken out as indicated for star or delta connections, the windings being in series for the delta connection and being connected in parallel, in pairs in the star connection for high speed.

I employ the term "track intersection" herein to designate crossovers, switches, turnouts or any condition in the track where the motor car running on the track is required to move laterally with respect to another part of the track. In such situations if full three phase trolley were employed a complication would result due to the intersection or by-pass of one phase conductor with respect to a conductor of different phase.

The changeover relay system may be employed for other purposes than shifting from three phase to single phase operation. It may be employed for automatically shifting from overhead trolley to third rail or vice versa or similar purposes.

As will appear from my copending application, Serial No. 357,538, filed April 23, 1929, the preferred form of current collector is a pantograph with the three collector shoes or pans 50—55 and 56 for the A, B and C phases of the trolley. This pantograph instead of being guided by the central trolley wire as shown in Figs. 2 and 3 herein is preferably guided from the rails, this guiding action being secured through the compensating device disclosed in said last named application. Assuming that the current collector has sufficient spring loading to apply the shoes with the proper pressure to the three trolley wires, such loading will all be concentrated on the central shoe 50 when the motor car passes into a single phase zone and the shoes 55 and 56 leave the outer trolley wires. To obviate this difficulty I show in Fig. 9 how the loading upon the collector shoes may be placed under the control of the changeover relay.

The pantograph arms 180 and 181 are suitably linked together for supporting the shoes 50—55 and 56 and are pivotally mounted on shafts 182 and 183 respectively. As the arms 180 and 181 swing toward each other they raise the shoes 50—55—56 and as they swing away from each other about the axes 182 and 183 they lower said shoes. Normally the arms 180 and 181 are pulled toward each other sufficiently by the tension springs 184, 185, anchored at their inner ends to the abutment 186 to apply sufficient load to the collector shoes for proper contact of shoe 50 with trolley wire 15A.

The springs 184 and 185 pull upon cables 187—188 fastened to drums 189—190 to urge the arms toward each other. The drum 189 is cam shaped so as to assist the spring 184 to raise the pantograph after it has been lowered as, for example, after the motor car has been out of service with the pantograph latched in down position. It is desirable to have such latching means for holding the collector or pantograph locked down while the car is being serviced or repaired.

For applying additional loading to receive proper contact pressure when the shoes 55—56 engage the trolley wires 15B and 15C, I provide the air cylinder 190' which has a piston 191 and rod 192 connected to crank 193, which crank is connected to arm 181 through shaft 183. By admitting air under proper reservoir pressure to cylinder 190, the additional loading is secured in definite amount. This air is supplied from reservoir 194 through pipe 195 under control of the magnet valve 196.

When changeover relay 73 raises contactor 75 it closes a local circuit from battery bus bar 76' through contacts 85 wire 197 solenoid 198 of relay 199 and wire 200 back to battery bus 81. Relay 199 raises its contactor 201 to bridge contacts 202. This closes a circuit for magnet 203 of magnet valve 196 over the following circuit battery bus 76' wire 204 through contacts 205 and contactor 206 of hand switch 207, wire 208, contacts 202 and bridging contactor 201 of relay 199, winding 203 and wire 200 back to battery bus 81. Thereby, when changeover relay 73 is energized (i. e. when the car is operating on three phase current) compressed air is applied to piston 191 by shifting of magnet valve 196 to admit live air and close off exhaust to atmosphere with respect to cylinder 190.

If desired, air pressure may be applied under hand control by means of the hand switch 209 which is connected in parallel with the contacts of relay 199.

A cylinder 210 having a piston 211 connected through rod 212, crank 213 and shaft 182 to pantogragh arm 180 is provided for lowering of the pantograph to a position where it may be latched down. For this purpose the hand switch 207 controls the magnet 214 of magnet valve 215 to connect the cylinder 210 to the reservoir 194 or to atmosphere. The circuit for operating the magnet valve 215 is cut through switch 217 interlocked with the main switch 66. Hand control switch 218 governs energizing control winding 219 to control operation of the main switch 66. If the main switch is closed, the pantograph should not be lowered. Therefore, the contacts 220 of hand switch 207 are connected through the switch 217 to prevent lowering of the pantograph until main switch 66 is opened. Contactor 221 of hand switch 207 closes a circuit from battery bus 81 through switch 217, wire 222, contacts 220, winding 214 of magnet valve 215 to wire 200 and back to battery bus 76. At the same time that hand switch 207 closes the circuit for opening valve 215, it opens the circuit for magnet 203 of valve 196 so as to insure that the cylinder 190 is open to atmosphere.

The relays 72 and 74, instead of directly switching the connections for the motor as in Figs. 4 and 5 or the transformer connections as shown in Fig. 6 to change from three phase to single phase or vice versa, operate through contactors 223—224 to govern a plurality of individual switch mechanisms.

Thus, for three phase operation when relay 72 is energized the switch operating windings 225 and 227 for closing switches 226 and 228 respectively are energized. Likewise for single phase operation when relay 74 is energized, windings 229—231 and 233 for operating switches 230—232 and 234 respectively are thereby energized. The circuits controlled by switches 226—230—232—228 and 234 are in all material respects the same as those shown in Fig. 6.

While the showing of the means for controlling the loading of the current collector is specific to a three shoe pantograph it will be apparent that the scheme is applicable to various forms of current collectors, for example, to the form shown in Figs. 2 and 3, or in fact any other form of collector when with change in the function of the collector a change in loading is desired.

In the form shown in Figs. 2 and 3 the loading cylinder might apply load to only the two outer shoes 55 and 56, the inner one 50 being controlled at all times by a spring such as 185.

I do not intend to be limited to the details shown and described.

I claim:

1. In an electric railway system the combination of a track consisting of sections, a three phase trolley for one section of said track, a single phase trolley for another section of said track, a motor driven car adapted to run on said sections of track and having a motor adapted to operate on single phase or on three phase, and means for automatically switching the motor from three phase to single phase when said car moves from one section of the track to another.

2. In an electric railway system in combination with a track a section of three wire trolley for supplying three phase alternating current and a connected section of single wire trolley for supplying single phase alternating current, a car having a driving motor capable of operating on either single phase alternating current or on three phase alternating current, three phase connections and single phase connections to said motor, and automatic means for shifting said connections of the motor when the car passes from one section of the trolley to another.

3. In an electric railway system a trolley section for supplying three phase alternating current, an adjacent trolley section for supplying single phase alternating current, a common source of three phase alternating current having a neutral connection, and a motor car having a collector cooperable with either section and a motor for said car adapted to operate on the full three phases of said source, or to operate from one phase to neutral of said source.

4. In an electric railway system a trolley section for supplying three phase alternating current, an adjacent trolley section for supplying single phase alternating circuit, a common source of three phase alternating current having a neutral connection, and a motor car having a collector cooperable with either section and a motor for said car adapted to operate on the full three phases of said source, or to operate from one phase to neutral of said source, and means to switch the connections of the motor automatically from three phase to single phase or vice versa.

5. In an electric railway system, a source of three phase alternating current, a three phase trolley section having three trolley wires connected to said source, an adjacent single phase trolley section having one trolley wire in series with a wire of the three phase section, a motor car having current collecting means cooperable with either of said trolley sections, a motor for said car operable either on three phase or single phase current and connections for selectively supplying from said collecting means to the motor three phase current or single phase current.

6. In an electric railway system, a source of three phase alternating current, a three phase trolley section having three trolley wires connected to said source, an adjacent single phase trolley section having one trolley wire in series with a wire of the three phase section, a motor car having current collecting means cooperable with either of said trolley sections, a motor for said car operable either on three phase or single phase current and connections for selectively supplying from said collecting means to the motor three phase current or single phase current, and automatic means for switching said connections as the car passes from one trolley section to another, said automatic means comprising a track contact and a contact cooperating therewith carried by said motor car.

7. In an electric railway system, a source of three phase alternating current having a neutral connection, a three phase trolley section having three trolley wires connected to said source, an adjacent single phase trolley section having one trolley wire connected to one of the trolley wires of the three phase section and having a neutral return, a motor car having current collecting means cooperable with either of said sections, a motor for said car having switchable connections to permit it to operate either on three phase current or on phase to neutral current, automatic means for switching said motor connections as the car passes from one trolley section to another, said automatic means comprising a switchover relay and a positional contact controlling the operation of said relay.

8. In combination, a source of three phase current having a neutral connection, a motor having three phase windings including a neutral connection for connecting said three phase windings to said source and connections for connecting one of the phase windings and the neutral of the motor to said source and a relay for switching said connections.

9. In combination, a source of three phase alternating current having a neutral, a motor having three phase windings including a netural, connections for connecting said three phase windings to said source and connections for connecting one of the phase windings and the neutral of the motor to said source, a change-over relay for switching said connections and a positional contact controlling the operation of said relay.

10. In combination, a source of three phase current having a neutral, a motor car having a driving motor, said motor having three phase windings and a neutral with connections for supplying three phase alternating current or single phase to neutral alternating current, a trolley system for said motor car providing a three phase section and a phase to neutral section, a positional contact for said motor car, and a relay controlled by said positional contact for switching the connections of said motor.

11. In a railway system a track, a source of three phase current having three phase conductors and a neutral conductor, a trolley system comprising a three phase section and an adjacent phase to neutral section, said three phase section comprising three trolley wires connected to the three phase conductors of the source, said single phase section comprising a single wire trolley with a neutral return connected to the neutral conductor of said source, said single trolley wire being continuous with one of the trolley wires of the three phase section, a collector cooperating with the trolley through both sections, a motor having windings including three phase connections and a neutral connection and being capable of operating on either three phase or on phase to neutral current from said source, a track contact at the junction of said sections and a relay controlled by said track contact for shifting said connections of said motor to cause operation of the motor by a three phase current in the three phase trolley section and single phase current to neutral in the single phase trolley section.

12. In a railway system a track, a source of three phase current having three phase conductors and a neutral conductor, a trolley system comprising a three phase section and an adjacent phase to neutral section, said three phase section comprising three trolley wires connected to the three phase conductors of the source, said single phase section comprising a single wire trolley with a neutral return connected to the neutral conductor of said source, said single trolley wire being continuous with one of the trolley wires of the three phase section, a collector cooperating with the trolley through both sections, a motor having windings including three phase connections and a neutral connection and being capable of operating on either three phase or on phase to neutral current from said source, a track contact at the junction of said sections and a relay controlled by said track contact for shifting said connections of said motor to cause operation of the motor by a three phase current in the three phase trolley section and single phase current to neutral in the single phase trolley section and means to prevent change-over of the motor connections from single phase to three phase until the motor car enters the three phase trolley section.

13. In a system of the class described a track, three trolley wires above the track, a source of three phase current to said trolley wires, said source having a neutral return carried along a section of said track, one of said trolley wires being carried continuously at the same level above the track the other two trolley wires being trained above said one trolley wire where the tracks intersect, a track contact adjacent such upward training of the trolley wires, a motor car having a collector for cooperating with said trolley wires, said collector comprising a controlling shoe engaging said one trolley wire and a pair of shoes for said two other trolley wires, said pair of shoes being adapted to leave the said two trolley wires where they are elevated, a motor for said car having windings and connections for operation on either three phase or single phase to neutral and switching means for said connection of the motor windings.

14. In a system of the class described a track including a track intersection, three trolley wires above the track, a source of three phase current connected to said three trolley wires, said source having a neutral conductor, a neutral return carried along a section of the track including said track intersection, one of said trolley wires being carried over the intersection at the same level above the track, the other two trolley wires being trained above the said one trolley wire over the track intersection, a track contact adjacent said upward training of the trolley wires, a motor car having a collector for cooperation with said trolley wires, said collector comprising a controlling shoe engaging said one trolley wire and a pair of shoes for said two other trolley wires, said pair of shoes being adapted to leave the said two trolley wires where they are elevated at the track intersection, a motor for said car having windings and connections for operation on either three phase or single phase to neutral current, a relay energized by current from two trolley shoes to control change of said motor connection and a contact on the car cooperating with the track contact for deenergizing said relay to cause restoration of said motor connection.

15. In an electric railway system a source of three phase alternating current having a neutral connection, current distribution means along said track for supplying three phase current or phase to neutral current, said means including three phase conductors and a neutral conductor, a motor car having current collecting means cooperating with the three phase conductors and having current collecting means cooperating with the neutral conductor, a motor having windings, switching means for connecting said windings to said three phase current collecting means for operation of the motor on three phase current or for connecting said windings between one of said phase conductors and the neutral conductor for operating the motor on phase to neutral current.

16. In an electric railway system a source of three phase alternating current having a neutral connection, current distribution means along said track for supplying three phase current or phase to neutral current, said means including three phase conductors and a neutral conductor, a motor car having current collecting means cooperating with the three phase conductors and having current collecting means cooperating with the neutral conductor, a motor having windings, switching means for connecting said windings to said three phase current collecting means for operation of the motor on three phase current or for connecting said windings between one of said phase conductors and the neutral conductor for operating the motor on phase to neutral current, and a track contact controlling said switching means.

17. In an electric railway system, a source of three phase alternating current having a neutral connection, current distribution means along said track for supplying three phase or phase to neutral current, said means including three phase conductors and a neutral conductor, a motor car having current collecting means cooperating with the three phase conductors and having current collecting means cooperating with the neutral conductor, a motor having windings, switching means for connecting said windings to said three phase collecting means for operation on three phase current or for connecting said windings between one of said phase conductors and a neutral conductor for operating the motor on phase to neutral current, a change-over relay controlling said switching means and a track contact governing the change-over relay.

18. In an electric railway system, a track including a track intersection, a source of three phase alternating current having a neutral connection, current distribution means along said track for supplying three phase or phase to neutral current, said means including three phase conductors and a neutral conductor, a motor car having current collecting means cooperating with the three phase conductors and having current collecting means cooperating with the neutral conductor, a motor having windings, switching means for connecting said windings to said three phase collecting means for operation on three phase current only or for connecting said windings between one of said phase conductors and a neutral conductor through both of said current collecting means for operating the motor on phase to neutral current only and a change-over relay controlling said switching means, said change-over relay being energized as said motor car approaches the said intersection.

19. In an electric railway system a track including a track intersection, a source of three phase current having a neutral connection, a three phase trolley extending over the track, two phases of the trolley being discontinued over the intersection, a neutral return for said portion of the track where the two phases are discontinued, a motor car operable on the track and having a motor operable on either three phase or on phase to neutral, windings for said motor, means for connecting said windings to the three phases of the trolley and means for connecting the neutral return to the winding when the motor car passes over the intersection to operate the motor on phase to neutral current.

20. In an electric railway system a track including a track intersection, a source of three phase current having a neutral connection, a three phase trolley extending over the track, two phases of the trolley being discontinued over the intersection, a neutral return for said portion of the track where the two phases are discontinued, a motor car operable on the track and having a motor operable on either three phase or phase to neutral current, a current collector for cooperating with the three phases of the trolley or with the single phase of the trolley where the two phases are discontinued, windings for said motor, means for connecting said windings through the current collector to the trolley and means for connecting the neutral return to the windings of the motor when the car passes under said part of the trolley where the two phases are discontinued.

21. In combination of track including a track intersection, a motor car for said track, a source of three phase current having a neutral conductor, a three phase trolley connected to said source, said trolley having a single phase conductor across said intersection, a neutral return conductor along said single phase conductor, a motor for said car having windings operable either three phase or phase to neutral, means connecting said windings to the trolley conductors and means for switching said motor onto said neutral return when the motor car passes over the track intersection, said means comprising a switch-over relay normally energized by current from the three phase section of the trolley.

22. In combination of track including a track intersection, a motor car for said track, a source of three phase current having a neutral conductor, a three phase trolley connected to said source, said trolley having a single phase conductor across said intersection, a neutral return conductor along said single phase conductor, a motor for said car having windings operable either three phase or phase to neutral, means connecting said windings to the trolley conductors and means for switching said motor onto said neutral return when the motor car passes over the track intersection, said means comprising a switch-over relay normally energized by current from the three phase section of the trolley, and a track contact adjacent said track intersection for deenergizing said relay.

23. In combination a track including a track intersection, a motor car for said track, a source of three phase current having a neutral connection, a three phase trolley connected to said source, said trolley having a single phase conductor across said intersection, a neutral return conductor along said single phase conductor, a motor for said car having windings operable either three phase or phase to neutral, means connecting said windings to the trolley conductors, and means for switching said motor onto said neutral return when the car passes over the track intersection, said means including a switch, means for holding said switch closed, and a track contact for releasing said holding means.

24. In combination a track including a track intersection, a motor car for said track, a source of three phase current having a neutral connection, a three phase trolley connected to said source, said trolley having a single phase conductor across said intersection, a neutral return conductor along said single phase conductor, a motor for said car having windings operable either on three phase current or on phase to neutral current, a three phase collector for connecting said windings to the trolley conductors, means for switching said motor windings onto said neutral return when the car passes over the track intersection, said means including a switch having two positions, said switch in one position connecting the motor to the three phase connections of the said collector and in the other position connecting the motor to one phase conductor of the collector and to neutral return.

25. In combination a track including a track intersection, a motor car for said track, a source of three phase current having a neutral connection, a three phase trolley connected to said source, said trolley having a single phase conductor across said intersection, a neutral return conductor along said single phase conductor, a motor for said car either on three phase current or on phase to neutral current, a three phase collector for connecting said motor to the trolley conductors, means for switching said motor onto said neutral return when the car passes over the track intersection, said means including a switch having two positions, said switch in one position connecting the motor to the three phase connections of the said collector and in the other position connecting the motor to one phase conductor of the collector and to neutral return, and a track contact for moving the switch into said other position.

26. In combination a track including a track intersection, a motor car for said track, a source of three phase current having a neutral connection, a three phase trolley connected to said source, said trolley having three phase conductors and having a single phase conductor across said intersection, a neutral return conductor along said single phase trolley conductor, said neutral return conductor being connected to the neutral connection of the three phase source, a motor for said car operable either on three phase current or on phase to neutral current, a collector having three phase conductors for connecting said motor to the trolley conductor, means for switching said motor onto said neutral return when the car passes over the track intersection, said means including a switch having two positions, said switch in one position connecting the motor to the three phase conductors of the said collector and in the other position, connecting the motor to one phase conductor of the collector and to the neutral return conductor and a track contact for moving the switch into said other position, said switch being shiftable to the one position when the three phases of the collector receive current from the trolley.

27. In combination a track including a track intersection, a motor car for said track, a source of three phase current having a neutral connection, a three phase three conductor trolley connected to said source, said trolley having a single phase conductor across said intersection, a neutral return conductor along said single phase trolley conductor, said neutral return conductor being connected to the neutral connection of the three phase source, a motor for said car operable on either three phase current or on phase to neutral current, a three phase conductor collector for connecting said motor to the trolley phase conductors, a relay switch having two positions, said switch in one position connecting the motor to the three phase conductors of the said collector and in the other position connecting the motor to the one phase conductor of the collector and to the neutral return, a winding for said relay switch and a track contact adjacent the track intersection for controlling the energization of said latter winding.

28. In an electric railway system, a track including a track intersection, a source of three phase current having a neutral conductor, a three phase trolley for the track comprising a single phase trolley section over the track intersection, two of the trolley phase conductors being discontinued over said track intersection, a neutral return along said single phase trolley section, a motor car having a current collector cooperating with said three phase trolley conductors and with the single phase conductor in said single phase trolley section and current collecting means for cooperating with said neutral return when said motor car passes over said intersection.

29. In an electric railway system, a track including a track intersection, a source of three phase current having a neutral conductor, a three phase trolley for the track comprising a single phase trolley section over the track intersection, two of the trolley phase conductors being discontinued over the track intersection, a neutral return along said trolley section, a motor car having a current collector cooperating with said three phase trolley conductors and with the single phase conductor in said single phase trolley section, a motor having three phase windings with a neutral connection, current collecting means for cooperating with said neutral return, and a switch-over relay controlling the switching of the neutral return connection to the motor winding.

30. In an electric railway system, a track including a track intersection, a source of three phase current having a neutral conductor, a three phase trolley for the track comprising a single phase trolley section over the track intersection, two of the trolley phase conductors being discontinued over the track intersection, a neutral return along said trolley section, a motor car having a current collector cooperating with said three phase trolley conductors and with the single phase conductor in said single phase trolley section, a motor having three phase windings with a neutral connection, current collecting means for cooperating with said neutral return, a switch-over relay controlling the switching of the neutral return connection to the motor winding, and a track contact controlling the operation of said switch-over relay.

31. In combination a track, a motor car therefor, a driving motor for the car having power supply connections, a potential transformer carried by the car, a relay energized by said potential transformer, said relay controlling said supply connections and a track contact for deenergizing said relay.

32. In combination a track, a motor car therefor, power supplying means along the track, a driving motor for the car having power supply connections, a potential transformer on the car connected through a part of said power supply connections, a relay controlling said motor connections, said relay being energized by said potential transformer and a track contact controlling said relay.

33. In combination a track, a motor car thereupon, means at one part of the track to supply power of one type to the motor car, means at another part of the track to supply power of a different type to the motor car, power collecting devices for cooperating with said means, a driving motor having connections, means for changing the motor connections to adapt the motor to said type of power respectively, a track contact, and means carried by the motor car and cooperating with said track contact for controlling said connection changing means.

34. In combination a track, a motor car, a three phase trolley for said track, a neutral return, said motor car having a motor, collector means for said trolley and a connection for said neutral return to permit single phase operation of the motor, and a positional contact along said track for switching said connection.

In witness whereof, I hereunto subscribe my name this first day of April, 1929.

ALLEN M. ROSSMAN.